United States Patent
Liu

(10) Patent No.: US 11,966,001 B1
(45) Date of Patent: Apr. 23, 2024

(54) CALCULATION METHOD, STORAGE MEDIUM AND DEVICE FOR SEABED REFLECTION COEFFICIENT OF POINT SOURCE ELASTIC WAVE

(71) Applicant: FIRST INSTITUTE OF OCEANOGRAPHY, MNR, Qingdao (CN)

(72) Inventor: Yangting Liu, Qingdao (CN)

(73) Assignee: FIRST INSTITUTE OF OCEANOGRAPHY, MNR, Qingdao (CN)

( * ) Notice: Subject to any disclaimer, the term of this patent is extended or adjusted under 35 U.S.C. 154(b) by 0 days.

(21) Appl. No.: 18/541,058

(22) Filed: Dec. 15, 2023

(30) Foreign Application Priority Data

Sep. 6, 2023 (CN) .......................... 202311139493.2

(51) Int. Cl.
*G01V 1/38* (2006.01)

(52) U.S. Cl.
CPC ........ *G01V 1/3852* (2013.01); *G01V 2210/58* (2013.01); *G01V 2210/63* (2013.01)

(58) Field of Classification Search
CPC ............. G01V 1/3852; G01V 2210/58; G01V 2210/63
See application file for complete search history.

(56) References Cited

U.S. PATENT DOCUMENTS

| 2002/0173916 A1 | 11/2002 | Chakraborty |
| 2003/0214287 A1 | 11/2003 | Sun |

FOREIGN PATENT DOCUMENTS

| CN | 104570072 A | 4/2015 |
| CN | 105629301 A | 6/2016 |
| CN | 107576388 A | 1/2018 |
| CN | 116520431 A | 8/2023 |
| CN | 116660996 A | 8/2023 |
| CN | 116859460 A | * 10/2023 |

(Continued)

OTHER PUBLICATIONS

Recursive calculation of reflection coefficients in multi-component seismic records in the frequency-wavenumber domain, Gu Hanming1), Wang Jiaying1), Zhu Guangming2), Chinese Journal of Geophysics, 2002, Issue 2, issued on Mar. 31, 2002.

*Primary Examiner* — Daniel Pihulic
(74) *Attorney, Agent, or Firm* — Jeenam Park

(57) ABSTRACT

The present disclosure relates to a calculation method, a storage medium and a device for a seabed reflection coefficient of point source elastic wave. The method includes initializing a calculation accuracy and a calculation range of the seabed reflection coefficient; discretizing a parameter space and obtaining the seabed reflection coefficient of point source elastic wave; combining an equivalent equation and a traditional calculation equation for the seabed reflection coefficient of point source elastic wave; solving an undetermined coefficient of the equivalent equation; obtaining a concise expression for the seabed reflection coefficient of point source under an accuracy in the first step; calculating the seabed reflection coefficient of point source elastic wave within a given calculation accuracy range using an obtained expression. The method of the present disclosure avoids problems of high complexity and low efficiency in a traditional calculation for the seabed reflection coefficient of point source elastic wave.

6 Claims, 6 Drawing Sheets

(56) References Cited

FOREIGN PATENT DOCUMENTS

| | | | |
|---|---|---|---|
| CN | 116879952 A | * | 10/2023 |
| WO | 03087878 A8 | | 10/2003 |
| WO | 2013169117 A1 | | 11/2013 |

* cited by examiner

CALCULATION METHOD, STORAGE MEDIUM AND DEVICE FOR SEABED REFLECTION COEFFICIENT OF POINT SOURCE ELASTIC WAVE

CROSS-REFERENCE TO RELATED APPLICATIONS

This application claims priority to Chinese Patent Application No. 202311139493.2, filed on Sep. 6, 2023, which is hereby incorporated by reference in its entirety.

TECHNICAL FIELD

The present disclosure relates to the field of geophysical exploration and acoustic exploration technologies, and in particular, to a calculation method, storage medium, and device for a seabed reflection coefficient of point source elastic wave.

BACKGROUND

The reflection coefficient of seabed elastic wave contains rich information on seismic wave fields (or sound fields) and elastic parameters of seabed sediments. The calculation of seabed reflection coefficient is the foundation of analyzing seabed reflection wave fields and inverting seabed elastic parameters. At present, the calculation methods for the seabed reflection coefficient are mostly based on the plane wave assumption, while the hypocenter (sound source) is mostly equivalent point sources, which renders the calculation method based on plane wave only be able to accurately describe the seabed reflection coefficient in far-field, high-frequency, and small incidence angles. The plane wave assumption cannot accurately describe the frequency variation and phase characteristics of the seabed reflection coefficient, and also cannot provide an appropriate amplitude information of the reflection coefficient under large incidence angles. Although the calculation complexity of plane wave reflection coefficient is low, the limitations of plane wave assumption limit its applicability in the above scenarios. Although the calculation method of point source reflection coefficient can avoid the limitations of plane wave assumption, its calculation process is complex and inefficient, which hinders the practical application of point source reflection coefficient. Therefore, it is necessary to improve the original calculation method to address the complex and inefficient calculation of point source seabed reflection coefficient. A concise and efficient method for calculating the seabed reflection coefficient of point source elastic wave is provided to ensure calculation accuracy and meet the needs of seabed reflection wave field analysis and seabed elastic parameter inversion.

SUMMARY

In order to solve the problems of high complexity and low efficiency in the calculation process of a seabed reflection coefficient of point source elastic wave mentioned above, the present disclosure proposes a calculation method, storage medium, and device for a seabed reflection coefficient of point source elastic wave. The method converts the solution of seabed reflection coefficient of point source into the solution of an undetermined coefficient of an equivalent equation and a concise expression of the seabed reflection coefficient of point source by solving the undetermined coefficient of the equivalent equation in advance is obtained, and the seabed reflection coefficient of point source elastic wave is efficiently calculated by using this expression.

The present disclosure is implemented through the following technical solutions.

A calculation method for a seabed reflection coefficient of point source elastic wave, including the following steps:
step 1: initializing a calculation accuracy and a calculation range of the seabed reflection coefficient;
step 2: discretizing a parameter space and obtaining the seabed reflection coefficient of point source elastic wave;
step 3: combining an equivalent equation with a traditional calculation equation for the seabed reflection coefficient of point source elastic wave;
step 4: solving the undetermined coefficient of the equivalent equation in step 3;
step 5: obtaining a concise expression for the seabed reflection coefficient of point source under an accuracy in step 1;
step 6: calculating the seabed reflection coefficient of point source elastic wave within a given calculation accuracy range using an obtained expression in step 5.

In an embodiment of the present disclosure, in step 2, the parameter space is discretized to obtain $M=[m_1\ m_2\ \ldots\ m_n]^T$, a corresponding seabed reflection coefficient of point source elastic wave is denoted as $R=[r_1'\ r_2'\ \ldots\ r_n']^T$, m is discrete points for each parameter that are evenly distributed within an initialized parameter space calculation range at intervals in the accuracy set in step 1; r' is the seabed reflection coefficient obtained from the traditional calculation method for the seabed reflection coefficient of point source elastic wave. Where, the traditional calculation method for the seabed reflection coefficient of point source elastic wave includes a reflection spherical wave integration method, a wave equation method, and a reflectivity calculation method.

In an embodiment of the present disclosure, in step 3, the equivalent equation and the traditional calculation equation for the seabed reflection coefficient of point source elastic wave are combined by the following equation:

$$f(W,m)=r \leftarrow r' \quad (1),$$

in equation (1), f(w,m)=r represents the equivalent equation, W is an undetermined coefficient of the equivalent equation, r is the seabed reflection coefficient, ← represents an assignment to a variable, and r' is the seabed reflection coefficient obtained by the traditional calculation method for the seabed reflection coefficient of point source elastic wave; the combination is performed within a parameter space range to obtain the following:

$$f(W,M)=R \quad (2),$$

in equation (2), R is the seabed reflection coefficient of the point source elastic wave.

In an embodiment of the present disclosure, in step 4, the undetermined coefficient of the equivalent equation is solved by the following equation:

$$W=G^{-1}R \quad (3),$$

in equation (3), G is a symmetric matrix $G_{ij}=\varphi(m_i,m_j)$ composed of Gaussian kernel function, $i,j \in \{k|k>0 \& k \in N\}$, R is the seabed reflection coefficient of the point source elastic wave.

In an embodiment of the present disclosure, the concise expression for the seabed reflection coefficient of point source obtained in step 5 is as follows:

$$r=g(m) \cdot W \quad (4),$$

in equation (4), $g(m)=[\varphi(m_1,m)\varphi(m_2,m) \ldots \varphi(m_i,m)]$, W is the undetermined coefficient of the equivalent equation.

An embodiment of the present disclosure further provides a computer-readable storage medium, where a computer program is stored thereon, the computer program implements the calculation method for a seabed reflection coefficient of point source elastic wave when be loaded and executed by a processor.

An embodiment of the present disclosure further provides a computer device including a memory and a processor, where a computer program is stored on the memory, the computer program implements the calculation method for a seabed reflection coefficient of point source elastic wave when executed by the processor.

The beneficial effects of the present disclosure compared to prior art are as following:

the present disclosure proposes a calculation method for a seabed reflection coefficient of point source elastic wave, which converts a solution of the seabed reflection coefficient of point source into a solution of the undetermined coefficient of the equivalent equation. By solving the undetermined coefficient of the equivalent equation in advance, a concise expression for the seabed reflection coefficient of point source is obtained. The calculation time of the calculation method required by the present disclosure is greatly reduced, which greatly improves the calculation efficiency, and on the premise of ensuring calculation accuracy, a problem of high complexity and low efficiency in the calculation process of seabed reflection coefficient of point source elastic wave has been avoided, thereby promoting a practical application of the reflection coefficient of point source.

DESCRIPTION OF EMBODIMENTS

The present disclosure is further described in detail below, and the proposed embodiments are only a part of the present application and not all of them. Based on the embodiments in the present disclosure, all other embodiments obtained by relevant technical personnel without creative work fall within the protection scope of the present disclosure.

Figure 1:
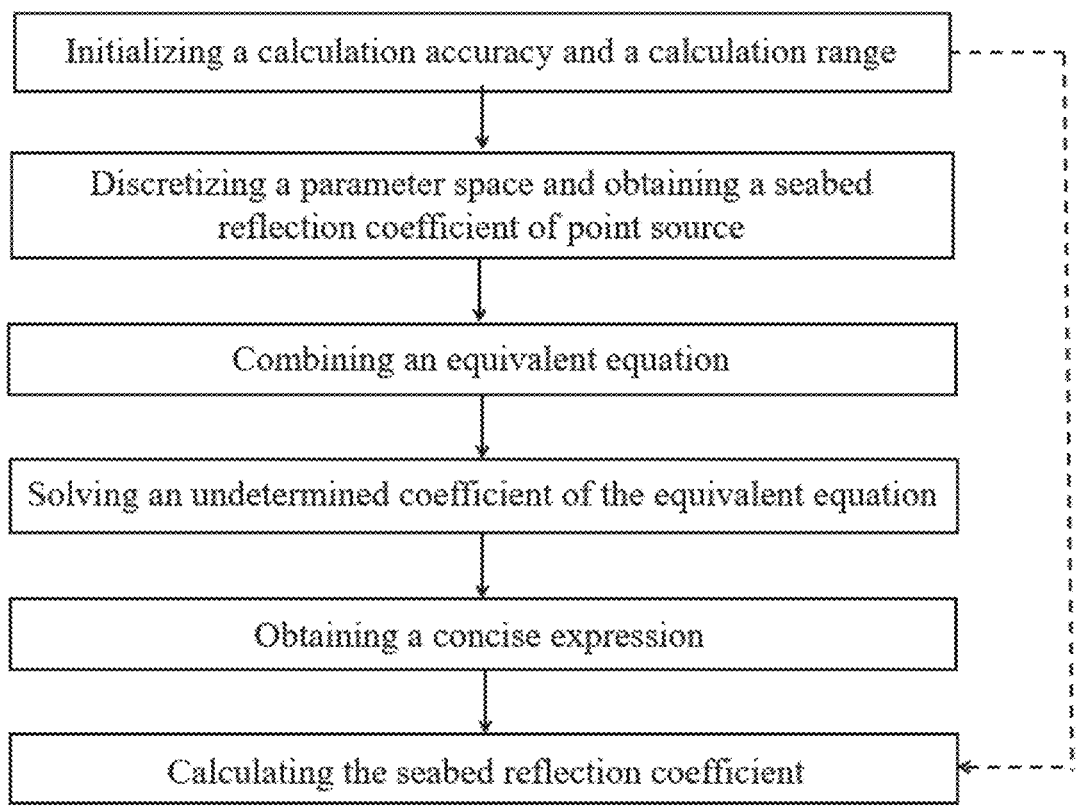
FIG. 1 is a flowchart of a calculation method of the present disclosure.

An embodiment of the present disclosure provides a calculation method for a seabed reflection coefficient of point source elastic wave, as shown in FIG. 1, which mainly includes the following steps:

step 1: initializing a calculation accuracy and a calculation range of the seabed reflection coefficient.

In this embodiment, the calculation accuracy and calculation range of the seabed reflection coefficient are constrained by initializing input parameters (including seabed elastic parameters, frequency, and propagation distance). The calculation range of parameter space is represented by $\Omega$, $\Omega=\{(\alpha,\beta, \rho, f, h)|\alpha\in[1450\ 1550],\beta\in[100\ 200], \rho\in[1500\ 1600], f\in[40\ 60], h\in[90\ 110]\}$ and the calculation accuracy is represented by $\delta$, $\delta=[\delta\alpha\ \delta\beta\ \delta\rho\ \delta f\ \delta h]=[50\ 50\ 50\ 5\ 5]$. And the seabed longitudinal wave velocity, seabed transverse wave velocity, seabed density, frequency, and propagation distance are represented by $\alpha$, $\beta$, $\rho$, f, h, respectively; all variables adopt the International System of Units.

Step 2: discretizing a parameter space and obtaining the seabed reflection coefficient of point source elastic wave.

Figure 2:
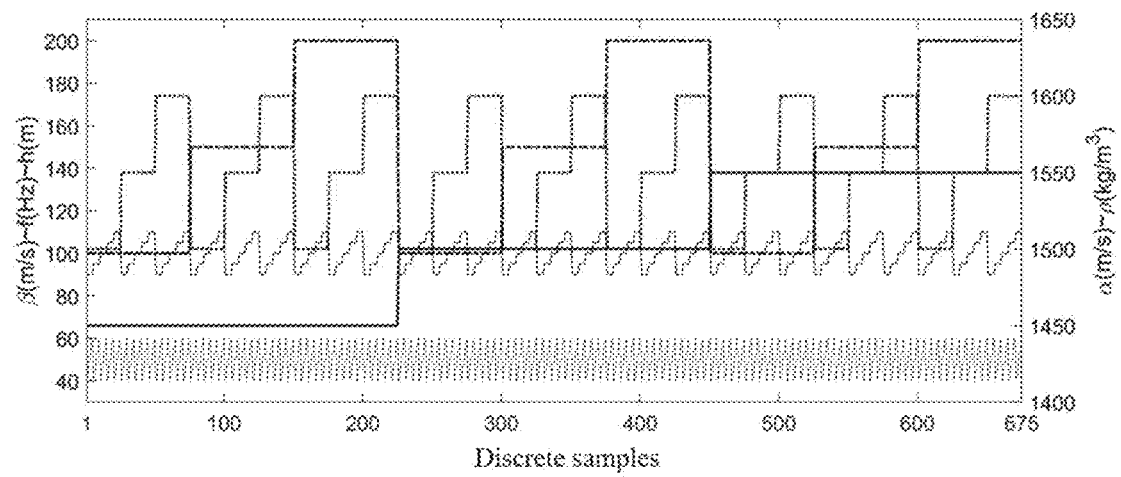
FIG. 2 is a diagram of discretized parameters.

By discretizing an input parameter according to an initialized parameter in step 1, $M=[m_1\ m_2 \ldots m_n]^T$ is obtained, it is obvious that in this embodiment, the number of discrete samples n=675, and the parameter space includes seabed longitudinal wave velocity, seabed transverse wave velocity, seabed density, frequency, and propagation distance $m=[\alpha\ \beta\ \rho\ f\ h]$. The discretized parameters of this embodiment are shown in FIG. 2. The value in abscissa of 1-675 indicates the number of discrete samples. Thick black solid line corresponding to the numerical range of 1450-1550 in the right coordinate axis represents the seabed longitudinal wave velocity $\alpha$, dashed line corresponding to the numerical range of 1500-1600 in the right coordinate axis represents the seabed density $\rho$, dotted line corresponding to the numerical range of 100-200 in the left coordinate axis represents the seabed transverse wave velocity $\beta$, thin solid line corresponding to the numerical range of 90-110 in the left coordinate axis represents the propagation distance h, and dashed line corresponding to the numerical range of 40-60 in the left coordinate axis represents the frequency.

Figure 3:
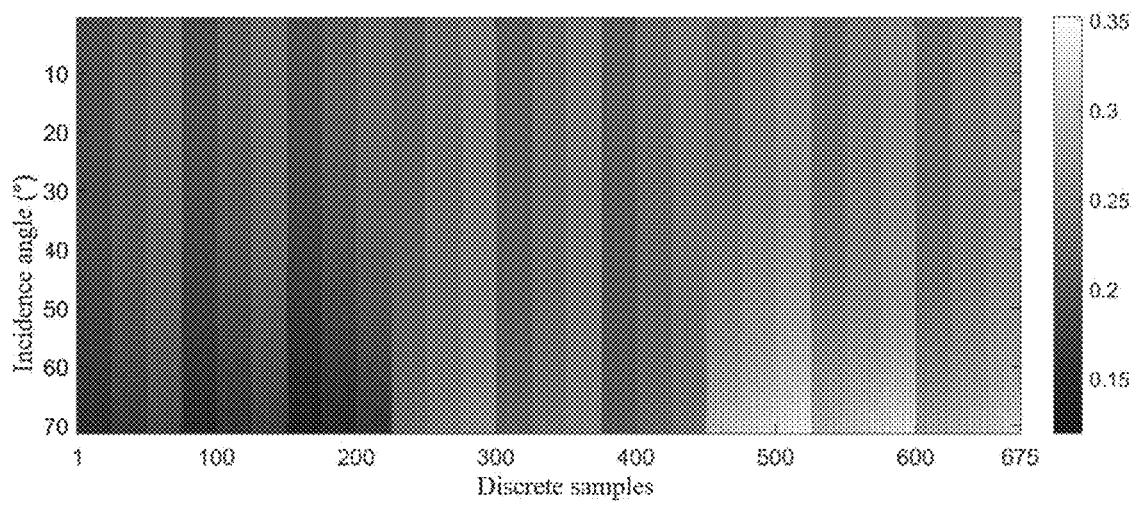
FIG. 3 is modular diagram of a seabed reflection coefficient.
Figure 4:
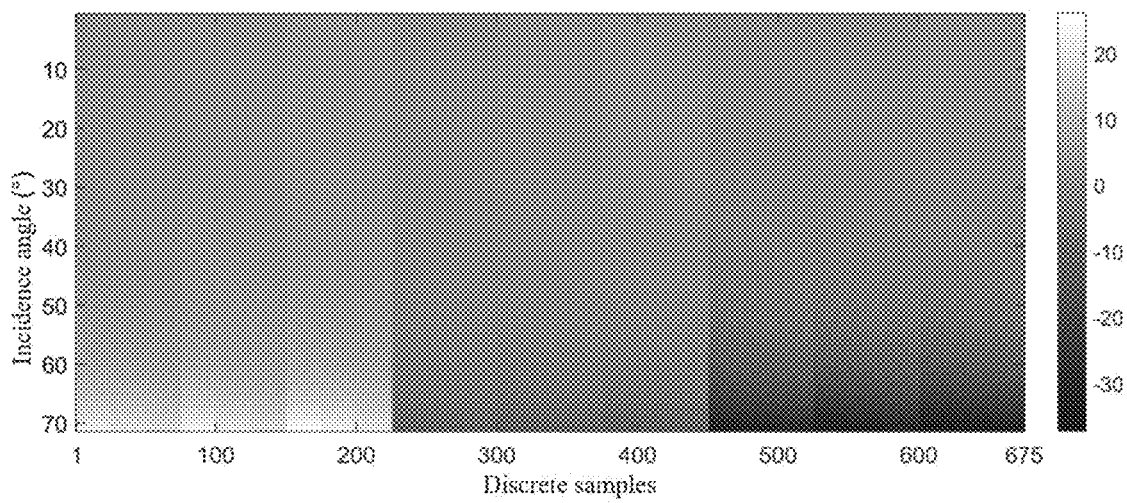
FIG. 4 is a phase diagram of the seabed reflection coefficient.

By utilizing the discretized parameters mentioned above, the seabed reflection coefficient can be obtained from the traditional calculation method of the seabed reflection coefficient of point source elastic wave. The traditional calculation method of the seabed reflection coefficient of point source elastic wave includes the reflection spherical wave integration method, wave equation method, and reflectance calculation method, and calculation results obtained from various methods are consistent with each other. The seabed reflection coefficients $R=[r_1'\ r_2' \ldots r_n']^T$ corresponding to the discretized parameters obtained in this embodiment are shown in FIG. 3 and FIG. 4 within an incidence angle range of 0° to 70°; FIG. 3 is a modular diagram of the seabed reflection coefficient, and FIG. 4 is a phase diagram of the seabed reflection coefficient.

Step 3: combining an equivalent equation with a traditional calculation equation for the seabed reflection coefficient of point source elastic wave.

Traditional calculation equation for the seabed reflection coefficient of point source elastic wave is combined with the equivalent equation through an assignment to a variable:

$$f(W,m)=r\leftarrow r' \quad (1),$$

in equation (1), f (w,m)=r represents the equivalent equation, W is an undetermined coefficient of the equivalent equation, r is the seabed reflection coefficient, ← represents an assignment to a variable; the combination is performed within a parameter space range to obtain the following:

$$f(W,M)=R \quad (2),$$

this embodiment wrote equation (2) to GW=R, G is a symmetric matrix $G_{ij}=\varphi(m_i,m_j)$ composed of Gaussian kernel function, $i,j \in \{k|k>0 \& k \in N\}$.

Step 4: solving the undetermined coefficient of the equivalent equation in step 3 with the following equation to obtain the undetermined coefficient of the equivalent equation.

$$W=G^{-1}R \quad (3),$$

Figure 5:
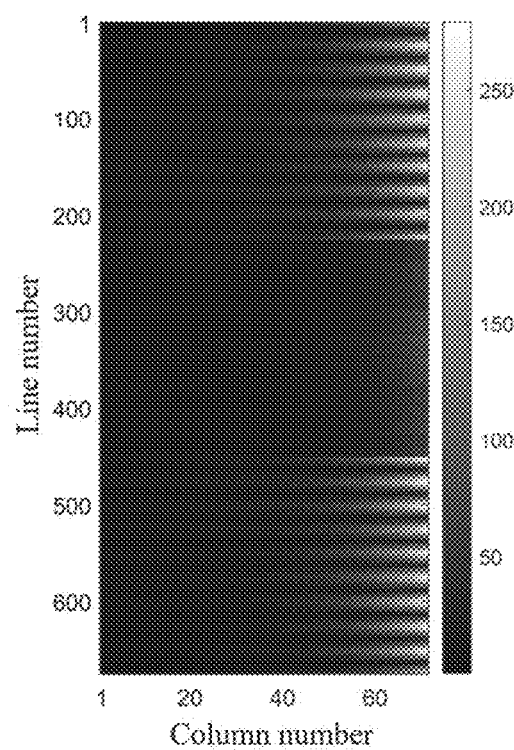
FIG. 5 is a modular diagram of an undetermined coefficient of an equivalent equation.
Figure 6:
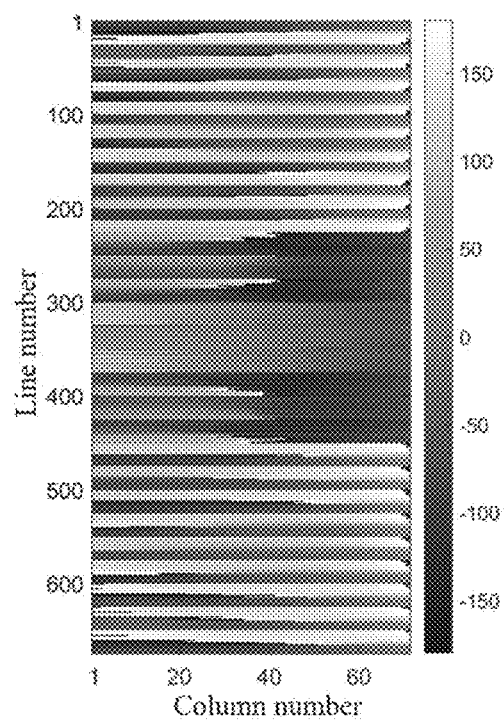
FIG. 6 is a phase diagram of the undetermined coefficient of the equivalent equation.

The undetermined coefficients of the equivalent equation calculated in this embodiment are shown in FIGS. 5 and 6, where FIG. 5 is a modular diagram of the undetermined coefficient of the equivalent equation, and FIG. 6 is a phase diagram of the undetermined coefficient of the equivalent equation.

Step 5: obtaining a concise expression for the seabed reflection coefficient of point source under an accuracy in step 1 with the following equation:

$$r=g(m) \cdot W \quad (4),$$

in equation (4), $g(m)=[\varphi(m_1,m)\varphi(m_2,m) \ldots \varphi(m_i,m)]$, $\varphi$ is Gaussian function.

Step 6: calculating the seabed reflection coefficient of point source elastic wave within a given calculation accuracy range using the concise expression obtained in step 5.

Figure 7:
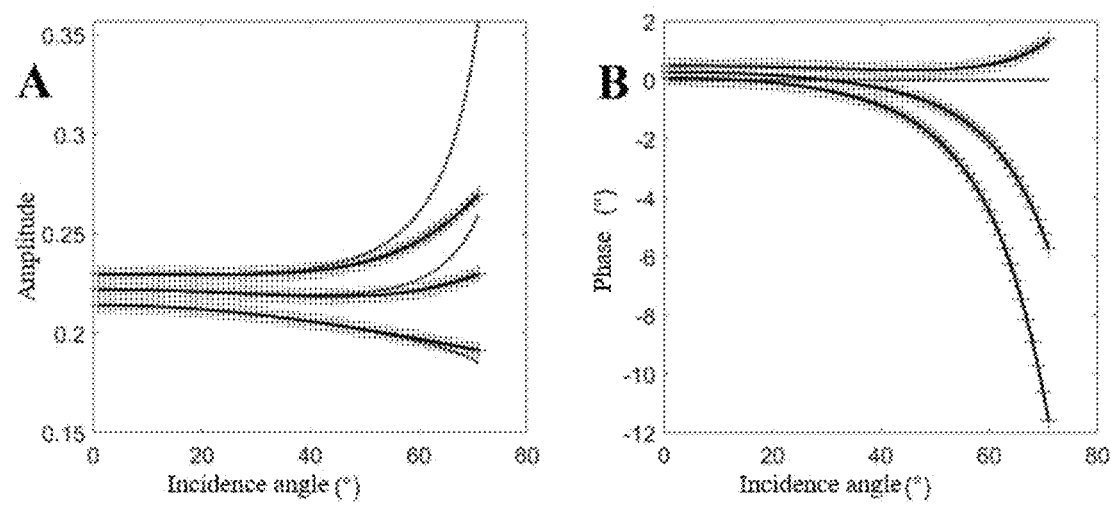
FIG. 7 is a diagram showing reflection coefficients under different longitudinal wave velocities; A is an amplitude plot and B is a phase plot.
Figure 8:
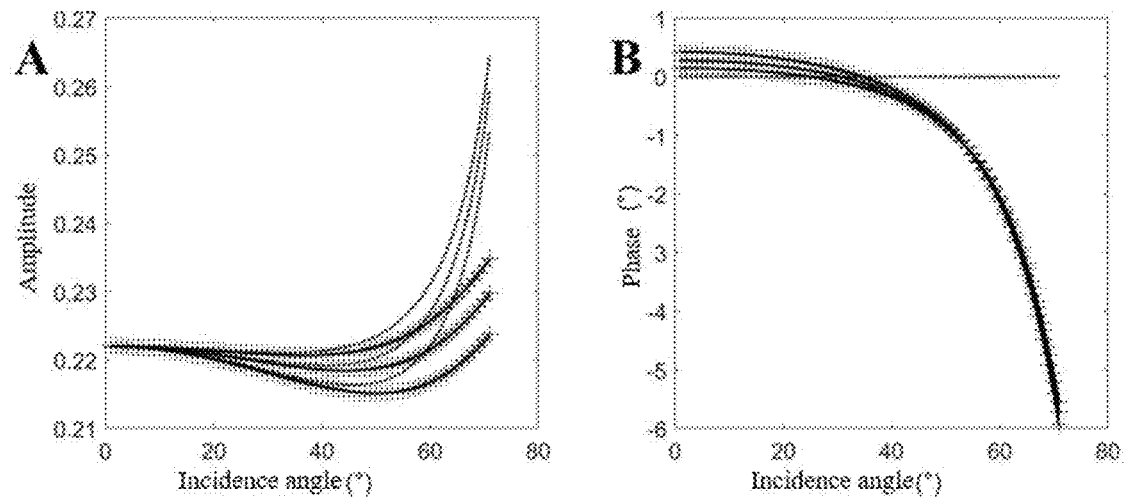
FIG. 8 is a diagram showing the reflection coefficients under different transverse wave velocities; A is the amplitude plot and B is the phase plot.
Figure 9:
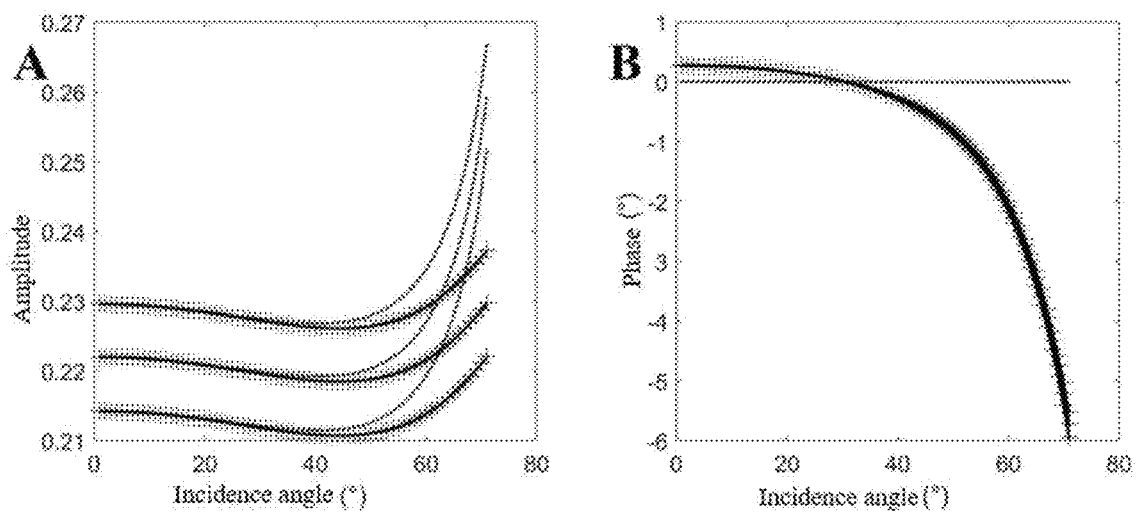
FIG. 9 is a diagram showing the reflection coefficients under different densities, A is the amplitude plot, and B is the phase plot.
Figure 10:
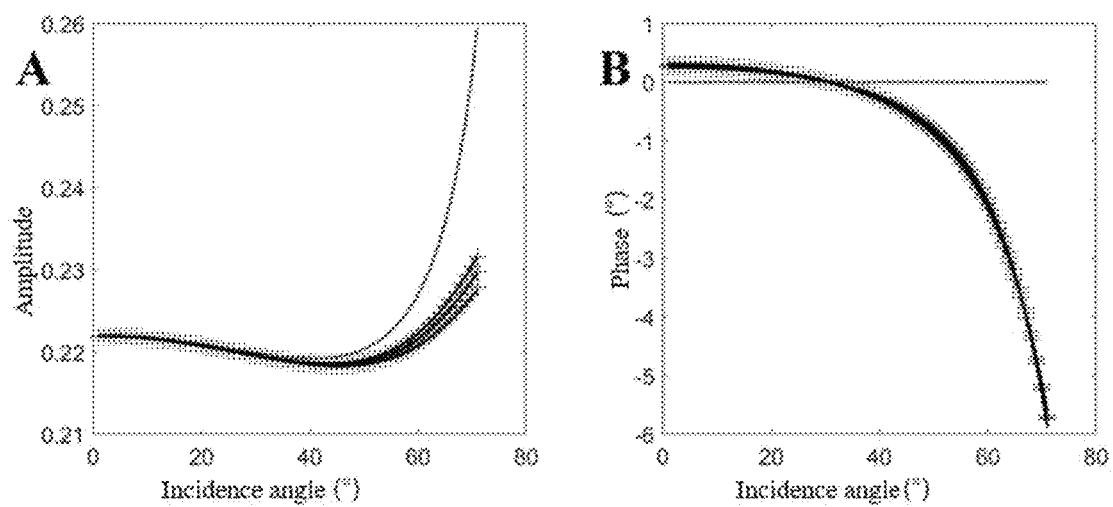
FIG. 10 is a diagram showing the reflection coefficients at different frequencies, A is the amplitude plot, and B is the phase plot.
Figure 11:
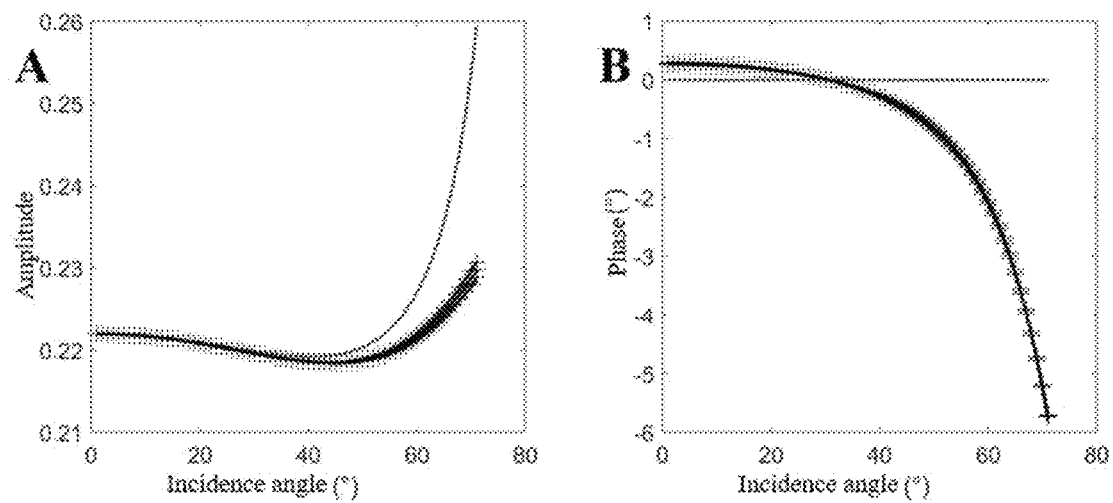
FIG. 11 is a diagram showing the reflection coefficients at different propagation distances, A is the amplitude plot and B is the phase plot.

As shown in Table 1, this embodiment calculates the seabed reflection coefficient of point source elastic wave for a center value (value 1) and a center deviation value (value 2, value 3) in the calculation range. Calculation results are shown in FIGS. 7 to 11, where dashed line represents a plane wave calculation result, solid line represents a calculation result of the traditional calculation method for the seabed reflection coefficient of point source elastic wave, and "+" represents a calculation result of the calculation method of the present disclosure. FIG. 7 shows the reflection coefficients under different longitudinal wave velocities, where the longitudinal wave velocities are "value 1", "value 2", and "value 3", respectively. The calculation results are obtained when all other parameters are "value 1"; FIG. 8 shows the reflection coefficients under different transverse wave velocities, where the transverse wave velocities are "value 1", "value 2", and "value 3", respectively. The calculation results are obtained when all other parameters are "value 1", similarly situations for FIGS. 9 to 11. Obviously, the calculation results of the present disclosure are consistent with those of traditional calculation methods for the seabed reflection coefficient of point source elastic wave at the same time, the calculation results of plane wave have significant errors, which cannot accurately describe the frequency variation and phase characteristics of the seabed reflection coefficient, and also cannot provide an appropriate amplitude information of the reflection coefficient under large incidence angles. The comparison between equation (4) and the reflection spherical wave integration method shows that the calculation time required by the calculation method of the present disclosure is significantly reduced, which greatly improves the calculation efficiency.

From the above results, it can be seen that the efficient calculation method for the seabed reflection coefficient of point source elastic wave proposed by the present disclosure not only has lower computational complexity and higher computational efficiency, but also can achieve the same accuracy as existing calculation methods, which avoids the limitations caused by plane wave calculation errors, and thereby promoting a practical application of point source reflection coefficient.

TABLE 1

| values | Longitudinal wave velocity α | Transverse wave velocity β | Seabed density ρ | Propagation distance h | Frequency f |
|---|---|---|---|---|---|
| Value 1 | 1500 | 150 | 1550 | 100 | 50 |
| Value 2 | 1475 | 125 | 1525 | 95 | 45 |
| Value 3 | 1525 | 175 | 1575 | 105 | 55 |

What is claimed is:

1. A calculation method for a seabed reflection coefficient of point source elastic wave, comprising the following steps:

step 1: initializing a calculation accuracy and a calculation range of the seabed reflection coefficient;

step 2: discretizing a parameter space and obtaining the seabed reflection coefficient of point source elastic wave;

step 3: combining an equivalent equation with a traditional calculation equation for the seabed reflection coefficient of point source elastic wave; wherein the equivalent equation and traditional calculation equation for the seabed reflection coefficient of point source elastic wave are combined by the following equation:

$$f(W,m)=r \leftarrow r' \quad (1),$$

in equation (1), f (w,m)=r represents the equivalent equation, W is an undetermined coefficient of the equivalent equation, r is the seabed reflection coefficient, ← represents an assignment to a variable, and r' is the seabed reflection coefficient obtained by the traditional calculation method for the seabed reflection coefficient of point source elastic wave; the combination is performed within a parameter space range to obtain the following:

$$f(W,M)=R \quad (2),$$

in equation (2), R is the seabed reflection coefficient of point source elastic wave;

step 4: solving the undetermined coefficient of the equivalent equation in step 3 with the following equation:

$$W=G^{-1}R \quad (3),$$

in equation (3), G is a symmetric matrix $G_{ij}=\varphi(m_i,m_j)$ composed of Gaussian kernel function, $i,j \in \{k|k>0 \& k \in N\}$, R is the seabed reflection coefficient of the point source elastic wave;

step 5: obtaining a concise expression for the seabed reflection coefficient of point source under an accuracy in step 1 with the following equation:

$$r=g(m) \cdot W \quad (4),$$

in equation (4), $g(m)=[\varphi(m_1,m)\varphi(m_2,m) \ldots \varphi(m_i,m)]$, W is the undetermined coefficient of the equivalent equation;

step 6: calculating the seabed reflection coefficient of point source elastic wave within a given calculation accuracy range using an obtained expression in step 5.

2. The calculation method for a seabed reflection coefficient of point source elastic wave according to claim 1, wherein, in step2, the parameter space is discretized to obtain $M=[m_1\ m_2\ \ldots\ m_n]^T$, a corresponding seabed reflection coefficient of point source elastic wave is denoted as $R=[r_1'\ r_2'\ \ldots\ r_n']^T$, m is discrete points for each parameter that are evenly distributed within an initialized parameter space calculation range at intervals in the accuracy set in step 1; r' is the seabed reflection coefficient obtained from the traditional calculation method for the seabed reflection coefficient of point source elastic wave.

3. A computer readable storage medium, wherein a computer program is stored thereon, the computer program implements the calculation method for a seabed reflection coefficient of point source elastic wave according to claim 1 when be loaded and executed by a processor.

4. A computer readable storage medium, wherein a computer program is stored thereon, the computer program implements the calculation method for a seabed reflection coefficient of point source elastic wave according to claim 2 when be loaded and executed by a processor.

5. A computer device, comprising a memory and a processor, wherein a computer program is stored on the memory, the computer program implements the calculation method for a seabed reflection coefficient of point source elastic wave according to claim 1 when executed by the processor.

6. A computer device, comprising a memory and a processor, wherein a computer program is stored on the memory, the computer program implements the calculation method for a seabed reflection coefficient of point source elastic wave according to claim 2 when executed by the processor.

\* \* \* \* \*